3,681,142
RADIAL SEALING RINGS AND METHOD OF IMPROVING THEIR SEALING ACTION

Wilhelm Schmitt, Erbach, near Heppenheim, Germany, assignor to Carl Freudenberg, Weinheim an der Bergstrasse, Germany
Filed Apr. 10, 1969, Ser. No. 815,532
Claims priority, application Germany, Apr. 10, 1968,
P 17 50 230.6
Int. Cl. B08b 3/08, 17/00
U.S. Cl. 134—42
10 Claims

ABSTRACT OF THE DISCLOSURE

A radial sealing ring which surrounds a rotary shaft is placed between a supply of hypoid oil or another lubricant which contains additives tending to form deposits on the sealing lip or lips of the sealing ring and/or on the shaft, and a mixture which is effective to either prevent the formation of or to dissolve the deposits on the sealing lips or edges of the sealing ring and/or on the rotating part which is engaged by the sealing ring. The mixture contains 43 percent by weight of hydrocarbons, 35 percent by weight of barium metal soap, 13.5 percent by weight of a zinc-containing compound of thiophosphoric acid, 8 percent by weight montmorillonite and 0.5 percent by weight of acetone.

BACKGROUND OF THE INVENTION

The present invention relates to sealing devices in general, and more particularly to improvements in sealing devices which utilize radial sealing rings. Still more particularly, the invention relates to sealing devices which employ radial sealing rings with one or more sealing lips and to a method of improving the sealing characteristics of such rings.

It is known to employ lubricants which contain special ingredients or additives; such additives enhance the lubricating characteristics of lubricants but they also tend to form deposits on the sealing rings (particularly in the region of sealing lips and sealing edges) and on the countersurfaces, particularly on the surfaces of rotary shafts which are surrounded and sealed by such rings. The additives react with the parts which are in contact therewith and form thereon deposits. The deposits become separated from adjoining surfaces and accumulate in the lubricant in the form of sludge. The sludge also contains deposits which are formed in the lubricant proper. The tendency to sludge formation increases with increasing thermal or other stressing of the lubricant. Oils and other types of lubricants which tend to develop deposits and sludge are known in the commerce as hypoid oils. Alloyed motor oils also tend to accumulate such deposits. The deposits and sludge invariably affect the sealing action of radial sealing rings.

SUMMARY OF THE INVENTION

An object of the invention is to provide a method of preventing the settling of undesirable deposits on the lips or edges of radial sealing rings and/or on surfaces which are in contact with such sealing rings.

Another object of the invention is to provide a novel sealing structure which employs one or more radial sealing rings.

A further object of the invention is to provide a method of improving the sealing action of radial sealing rings.

The method of my invention is utilized to enhance the sealing action of radial sealing rings which are employed in areas lubricated by lubricants (e.g., hypoid oils) containing additives which tend to form deposits whereby such deposits settle on the sealing ring or rings and/or on the rotary parts (such as shafts) which are engaged by the sealing rings. The method comprises the steps of forming a mixture which attacks (dissolves and/or prevents the formation of) the deposits, and applying such mixture to that side of a radial sealing ring which faces away from the supply of lubricant. The mixture contains crude oil hydrocarbons or synthetically produced hydrocarbons (soap, silicate, at least one consistency forming agent (such as an inorganic gel former), at least one dispersing agent (such as a compound of thiophosphoric acid) and at least one detergent (such as acetone). Such mixture insures that the deposits on the sealing lips or edges of radial sealing rings and/or on the surfaces of revolving parts are either dissolved or cannot develop at all.

The novel features which are considered as characteristic of the invention are set forth in particular in the appended claims. The improved sealing structure itself, both as to its construction and the mode of utilizing the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
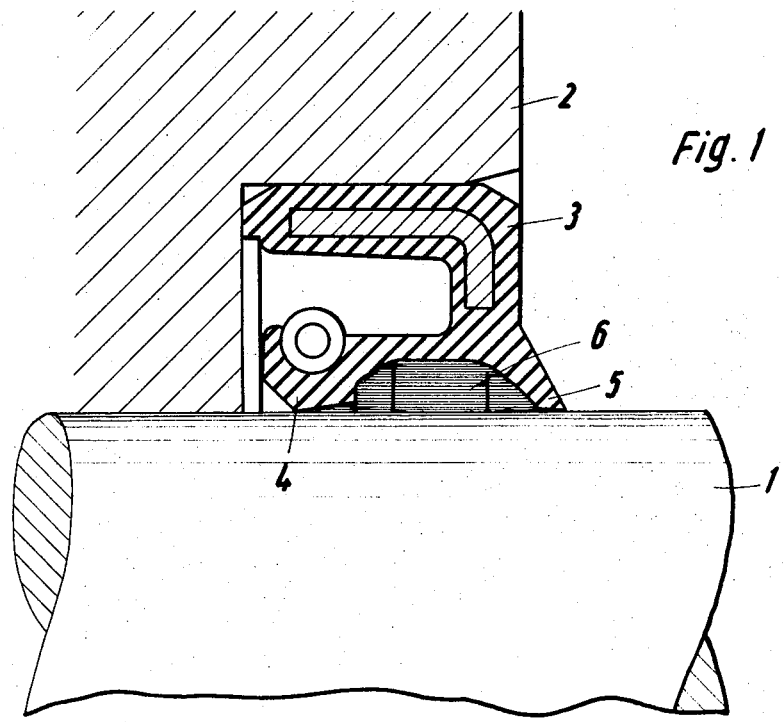
FIG. 1 illustrates a radial sealing ring and a compartment which is designed to receive and to contain a novel mixture serving to prevent the formation and/or accumulation of deposits and being intended to reach the sealing lip of the sealing ring.

FIG. 1 illustrates schematically a housing 2 and a rotary shaft 1. Oil or other lubricant which tends to cause the formation of undesirable deposits is accommodated in a space located to the left of the housing 2. The radial sealing ring 3 is formed with a customary sealing lip 4 and with an additional or auxiliary sealing lip 5. The latter is spaced from the lip 4 in axial direction of the shaft 1 and extends from the main portion of the sealing ring 3 toward the shaft. The lips 4, 5 and the shaft 1 define a compartment or chamber 6 which is filled with a novel mixture serving to prevent the formation or accumulation of aforementioned deposits.

Figure 2:
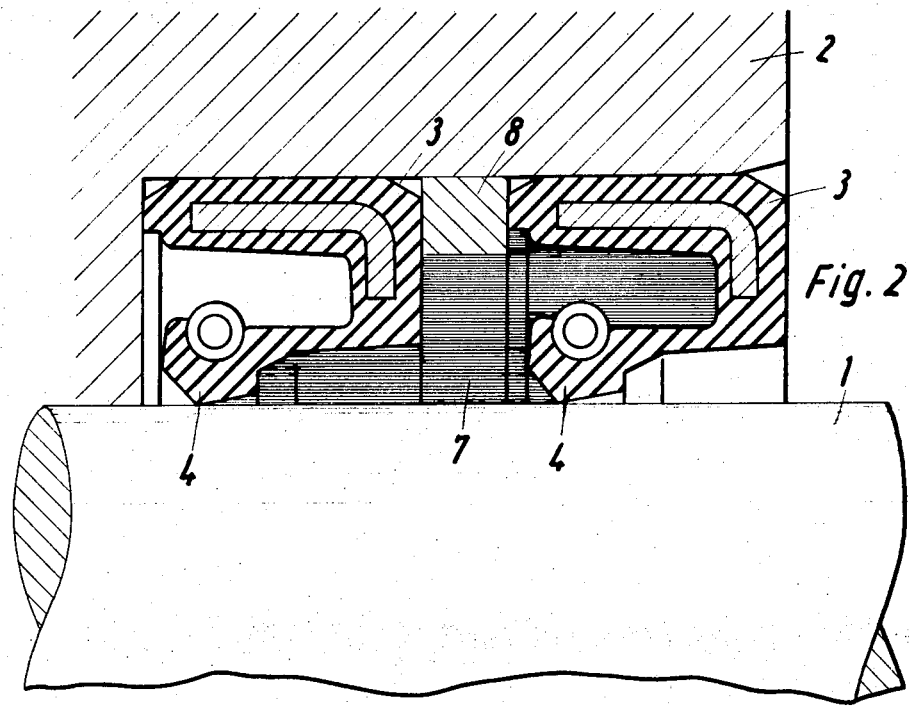
FIG. 2 illustrates a sealing structure which comprises two radial sealing rings flanking a compartment for the novel mixture.

In the embodiment of FIG. 2, there are provided two radial sealing rings 3 having sealing lips 4. The sealing rings define a compartment or chamber 7 which is flanked by the lips 4 and shaft 1. The numeral 8 denotes an intermediate sealing ring. The compartment 7 is filled with or contains a mixture which eliminates or prevents the formation of deposits. It is clear that the sealing structure can define two or more compartments for the novel mixture.

The compartments shown in FIGS. 1 and 2 are intended to receive a mixture which serves to prevent the formation and accumulation of deposits developing when a lubricant contains the aforementioned ingredients or additives, namely, substances which are intended to enhance its lubricating action but which tend to cause the formation of deposits which exert an adverse influence on the sealing action of sealing rings. The compartment or compartments for reception of the novel mixture are substantially sealed from the supply of lubricant containing the aforementioned additive or additives. The novel mixture also serves as a lubricant and is brought close to such part or parts of the sealing ring or rings and/or adjoining parts (shafts, housing, etc.) on which the deposits are likely to accumulate. The novel mixture prevents the formation of and/or dissolves the deposits.

The improved method comprises utilizing a mixture which contains synthetically produced lubricating hydrocarbons or lubricating hydrocarbons which are obtained from crude oil. The mixture further contains soaps, silicates, one or more inorganic gel forming agents or other types of consistency building additives, compounds of thiophosphoric acid or other types of dispersing agents, and one or more detergents.

The following is a specific example of a mixture which can be utilized in the practice of the present invention:

The mixture contains 43 percent by weight of hydrocarbons obtained from crude oil, 35 percent by weight of barium metal soap, 13.5 percent by weight of zinc-containing compounds of thiophosphoric acid, 8 percent by weight of montmorillonite, and 0.5 percent by weight of acetone or another solvent.

The novel mixture can be produced from commercially available ingredients which contain the elements barium, zinc, sulfur and phosphorus. The mixture can further contain selenium, boron and related substances. Montmorillonite is utilized as an inorganic gel former. Other suitable gel formers are silica gel, aluminum silicates and others. Acetone is the presently preferred dispersing agent.

The ingredients, including the gel formers and dispersing agent or agents, are then converted into a thixotropic mixture of the type known as DD-additives (detergent-dispersant additives).

The manner of introducing the novel mixture into the compartments shown in FIGS. 1 and 2 is the same as the manner of admitting a customary lubricant.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

1. A method of enhancing the sealing action of radial sealing rings which are utilized in areas lubricated by lubricants containing additives tending to form deposits, comprising the step of applying at that side of a radial sealing ring which faces away from the lubricant a mixture which attacks said deposits.

2. A method as defined in claim 1, wherein the mixture contains ingredients which dissolve the deposits.

3. A method as defined in claim 1, wherein said mixture contains ingredients which prevent the formation of deposits.

4. A method as defined in claim 1, wherein the lubricant is hypoid oil.

5. A method as defined in claim 1, wherein said mixture comprises 43 percent by weight of crude oil hydrocarbons, 35 percent by weight of a barium metal soap, 13.5 percent by weight of a zinc-containing compound of thiophosphoric acid, 8 percent by weight of montmorillonite, and 0.5 percent by weight of a solvent.

6. A method as defined in claim 5, wherein said solvent is acetone.

7. A method as defined in claim 1, wherein the mixture contains lubricating hydrocarbons, soap, silicate, at least one consistency-forming agent, at least one dispersing agent and at least one detergent.

8. A method as defined in claim 7, wherein said mixture contains synthetic lubricating hydrocarbons.

9. A method as defined in claim 7, wherein said mixture contains an inorganic gel former which constitutes said consistency-forming agent.

10. A method as defined in claim 7, wherein said dispersing agent is a compound of thiophosphoric acid.

References Cited
UNITED STATES PATENTS

| | | | |
|---|---|---|---|
| 3,000,822 | 9/1961 | Higgins et al. | 252—32.7 |
| 3,017,361 | 1/1962 | Morris et al. | 252—35 |
| 3,207,521 | 9/1965 | Dega | 277—37 |
| 3,216,936 | 11/1965 | Le Suer | 252—32.7 |
| 3,238,130 | 3/1966 | Matson | 252—32.7 |
| 3,259,574 | 7/1966 | Morrison et al. | 252—28 |
| 3,467,395 | 9/1969 | Kan | 277—37 |

MORRIS O. WOLK, Primary Examiner

J. T. ZATARGA, Assistant Examiner

U.S. Cl. X.R.

134—40; 277—1